(12) United States Patent
Bae et al.

(10) Patent No.: US 11,797,346 B2
(45) Date of Patent: Oct. 24, 2023

(54) ELECTRONIC DEVICE FOR CONTROLLING PROCESSING UNIT ON BASIS OF TIME SPENT FOR GENERATING FRAME AND MAXIMUM ALLOWED TIME AND METHOD OF OPERATING ELECTRONIC DEVICE

(71) Applicant: Samsung Electronics Co., Ltd., Suwon-si (KR)

(72) Inventors: Jinshik Bae, Suwon-si (KR); Hongcheol Sim, Suwon-si (KR); Kiljae Kim, Suwon-si (KR); Jaeho Kim, Suwon-si (KR); Hyunchul Seok, Suwon-si (KR); Youngcheol Sin, Suwon-si (KR); Wonseo Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 235 days.

(21) Appl. No.: 17/106,491

(22) Filed: Nov. 30, 2020

(65) Prior Publication Data

US 2021/0248010 A1 Aug. 12, 2021

(30) Foreign Application Priority Data

Feb. 10, 2020 (KR) .......................... 10-2020-0015912

(51) Int. Cl.
*G06F 9/50* (2006.01)
*G09G 5/36* (2006.01)
(Continued)

(52) U.S. Cl.
CPC .......... *G06F 9/5027* (2013.01); *G06F 9/3009* (2013.01); *G06T 1/20* (2013.01); *G09G 5/363* (2013.01)

(58) Field of Classification Search
CPC .... G06F 9/5027; G06F 9/3009; G06F 9/4893; G06F 9/505; G06F 9/5055; G06T 1/20
(Continued)

(56) References Cited

U.S. PATENT DOCUMENTS 7,450,130 B2 11/2008 Swedberg et al.
9,378,536 B2 6/2016 Park et al.
(Continued)

FOREIGN PATENT DOCUMENTS

JP 2011-113454 A 6/2011

OTHER PUBLICATIONS

International Search Report dated Feb. 22, 2021, issued in International Application No. PCT/KR2020/016388.
(Continued)

*Primary Examiner* — Sahlu Okebato
(74) *Attorney, Agent, or Firm* — Jefferson IP Law, LLP

(57) ABSTRACT

An electronic device and a method of operating an electronic device are provided. The electronic device includes a memory, a display, and a processor including a plurality of cores generating a plurality of frames including a first frame and a second frame, wherein the processor is configured to identify a first time spent for generating the first frame to be displayed on the display and a second time corresponding to a frame rate of the display, determine whether to perform an operation of controlling the plurality of cores for reducing a time for generating the second frame, based on a result of comparison between the first time and the second time, determine a size of a load for processing a thread related to generation of the second frame, based on a ratio between the first time and the second time, in response to the determination to perform the operation of controlling the cores, allocate at least one of the plurality of cores as cores to process the thread, based on the determined size of the load,
(Continued)

determine an operation frequency of the cores, based on the determined size of the load, and control the cores to generate the second frame according to the determined operation frequency.

20 Claims, 8 Drawing Sheets

(51) Int. Cl.
*G06T 1/20* (2006.01)
*G06F 9/30* (2018.01)

(58) Field of Classification Search
CPC .............. G09G 5/363; G09G 2360/06; G09G 2360/08; G09G 5/001; Y02D 10/00
See application file for complete search history.

(56) References Cited

U.S. PATENT DOCUMENTS

| | | | |
|---|---|---|---|
| 10,319,335 B2* | 6/2019 | Park | G09G 5/395 |
| 2009/0135180 A1 | 5/2009 | Li | |
| 2009/0309885 A1 | 12/2009 | Samson et al. | |
| 2012/0223954 A1 | 9/2012 | Samson et al. | |
| 2014/0063026 A1* | 3/2014 | Oh | G06F 1/3203 |
| | | | 345/519 |
| 2014/0097251 A1* | 4/2014 | Joussen | G06K 7/1491 |
| | | | 235/462.07 |
| 2014/0173150 A1* | 6/2014 | Yu | G06F 1/3203 |
| | | | 710/267 |
| 2014/0184619 A1 | 7/2014 | Kim | |
| 2014/0223219 A1 | 8/2014 | Aelion et al. | |
| 2018/0300838 A1 | 10/2018 | Park et al. | |
| 2018/0321980 A1* | 11/2018 | Lo | G06N 7/01 |
| 2018/0365062 A1 | 12/2018 | Roberts et al. | |

OTHER PUBLICATIONS

Extended European Search Report dated Nov. 9, 2022, issued in European Application No. 20918211.2-1203.

* cited by examiner

ELECTRONIC DEVICE FOR CONTROLLING PROCESSING UNIT ON BASIS OF TIME SPENT FOR GENERATING FRAME AND MAXIMUM ALLOWED TIME AND METHOD OF OPERATING ELECTRONIC DEVICE

CROSS-REFERENCE TO RELATED APPLICATION(S)

This application is based on and claims priority under 35 U.S.C. § 119(a) of a Korean patent application number 10-2020-0015912, filed on Feb. 10, 2020, in the Korean Intellectual Property Office, the disclosure of which is incorporated by reference herein in its entirety.

BACKGROUND

1. Field

The disclosure relates to an electronic device and a method of operating an electronic device. More particularly, the disclosure relates to an electronic device for controlling a processing unit which processes generation of a frame on the basis of a time spent for generating the frame to be displayed on a display and a maximum allowed time.

2. Description of Related Art

Various electronic devices such as smart phones, tablet personal computers (PCs), portable multimedia players (PMPs), personal digital assistants (PDAs), laptop PCs, and wearable devices are widely spread The electronic device may include a display supporting a high frame rate in order to provide a user with improvement of various usages including a smooth screen switching effect.

The electronic device may include a display supporting a relatively high frame rate to display relatively many frames per second, which may provide a user with a smooth screen output.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method of operating the apparatus.

An electronic device supporting a relatively high frame rate may have a time allowed for generating one frame which is relatively shorter than other electronic devices. For example, when the electronic device drives a display having a frame rate of 60 fps, the electronic device is required to completely generate one frame within about 16.6 ms. When the electronic device drives a display having a frame rate of 120 fps, the electronic device is required to completely generate one frame within about 8.3 ms.

Due to a decrease in a time required for generating one frame, the frequency of occurrence of a situation in which the frame cannot be generated within the time required for generating one frame may increase.

When the electronic device is not able to generate the frame within a maximum time allocated for generating one frame, a situation in which the frame to be displayed on a display cannot be normally displayed on the display may occur and a user of the electronic device may recognize that the screen breaks off, and thus usability may deteriorate.

Additional aspects will be set forth in part in the description which follows and, in part, will be apparent from the description, or may be learned by practice of the presented embodiments.

In accordance with an aspect of the disclosure, an electronic device is provided. The electronic device includes a memory, a display, and a processor including a plurality of cores generating a plurality of frames including a first frame and a second frame, wherein the processor is configured to identify a first time spent for generating the first frame to be displayed on the display and a second time corresponding to a frame rate of the display, determine whether to perform an operation of controlling the plurality of cores for reducing a time for generating the second frame, based on a result of comparison between the first time and the second time, determine a size of a load for processing a thread related to generation of the second frame, based on a ratio between the first time and the second time, in response to the determination to perform the operation of controlling the cores, allocate at least one of the plurality of cores as cores to process the thread, based on the determined size of the load, determine an operation frequency of the cores, based on the determined size of the load, and control the cores to generate the second frame according to the determined operation frequency.

In accordance with another aspect of the disclosure, a method of operating an electronic device is provided. The method includes identifying a first time spent for generating a first frame among a plurality of frames including the first frame and a second frame to be displayed on a display of the electronic device and a second time corresponding to a frame rate of the display, determining whether to perform an operation of controlling the plurality of cores implemented in a processor of the electronic device for reducing a time for generating the second frame, based on a result of comparison between the first time and the second time, determining a size of a load for processing a thread related to generation of the second frame, based on a ratio between the first time and the second time, in response to the determination to perform the operation of controlling the cores, allocating at least one of the plurality of cores as cores to process the thread, based on the determined size of the load, determining an operation frequency of the cores, based on the determined size of the load, and controlling the cores to generate the second frame according to the determined operation frequency.

Through an electronic device and a method of operating an electronic device according to various embodiments, it is possible to compare a first time spent for generating a frame and a second time which is a maximum time allowed for generating the frame and increase an operation frequency of a core which performs a task for generating the frame on the basis of a ratio between the first time and the second time when the first time is longer than the second time. As the operation frequency of the core increases, the time spent for generating the frame may decrease, and thus smooth driving using a display supporting a high fps may be implemented.

Through an electronic device and a method of operating an electronic device according to various embodiments, it is possible to allocate a task for generating a frame to a core having relatively high performance when the first time is longer than the second time. As the core having relatively high performance processes the task for generating the frame, the spent for generating the frame may decrease, and thus smooth driving using a display supporting a high fps may be implemented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
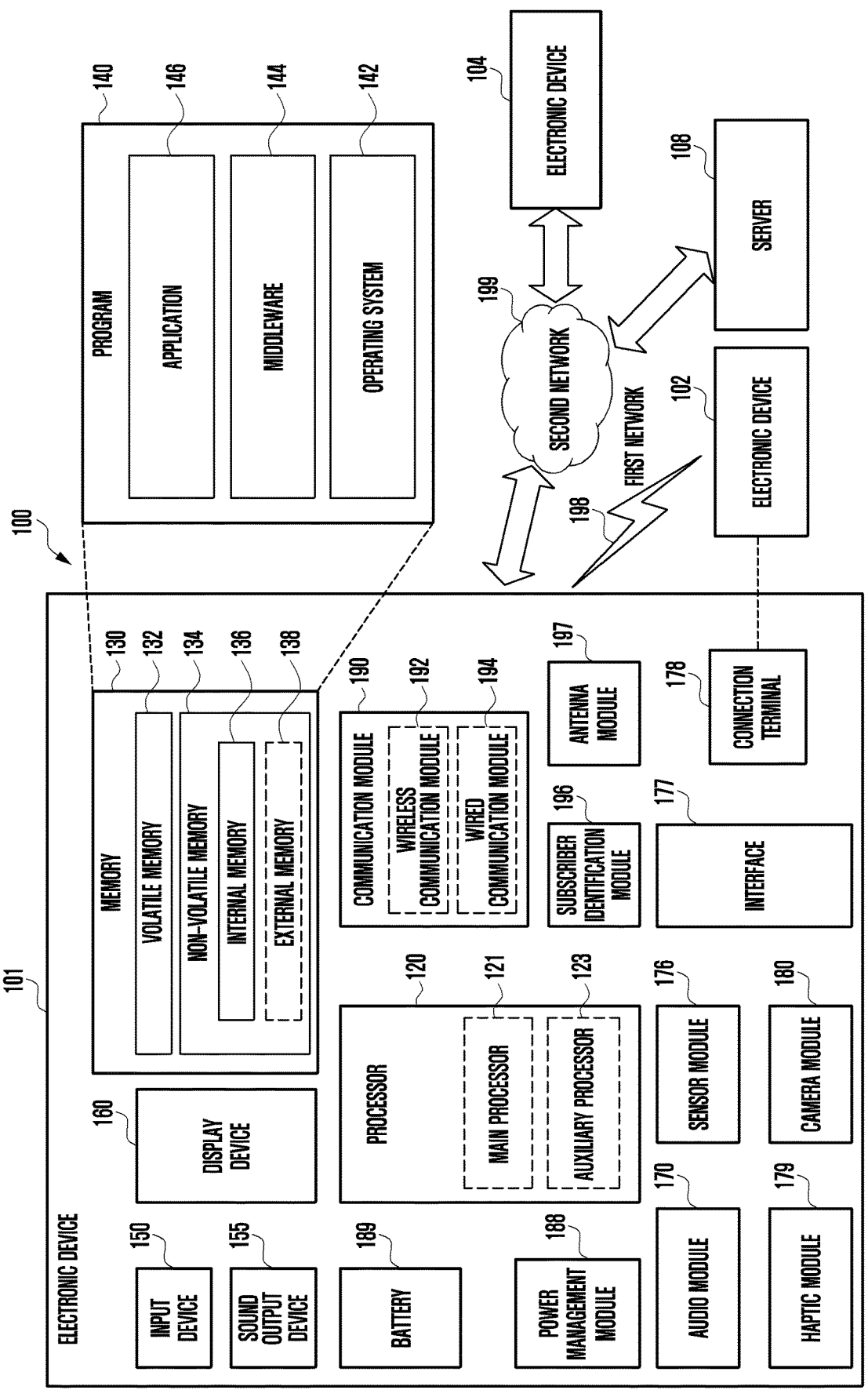
FIG. 1 is a block diagram of an electronic device according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
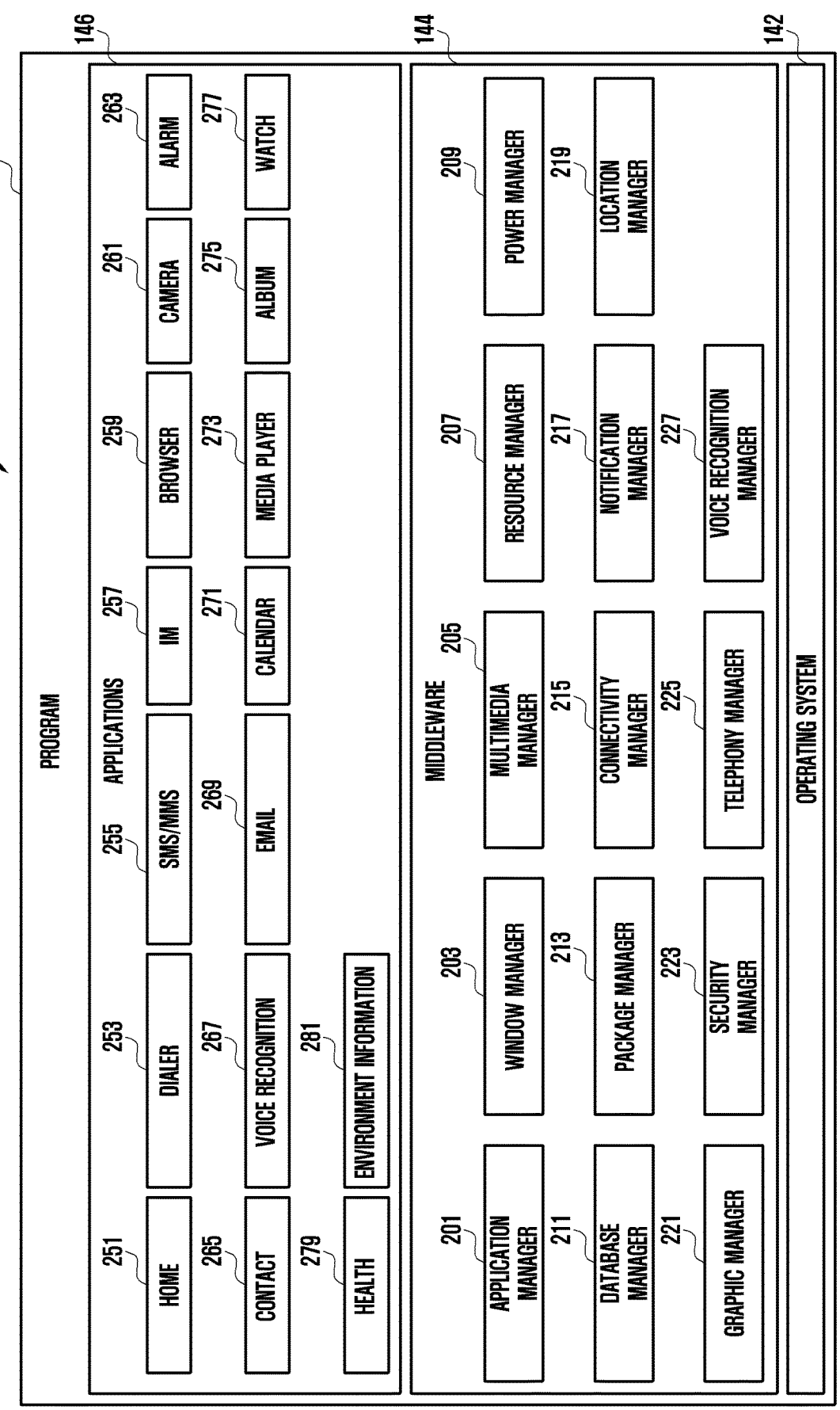
FIG. 2 is a block diagram of a program according to an embodiment of the disclosure.

FIG. 2 is a block diagram illustrating a program according to an embodiment of the disclosure.

Referring to FIG. 2 and the block diagram 200, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be preloaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
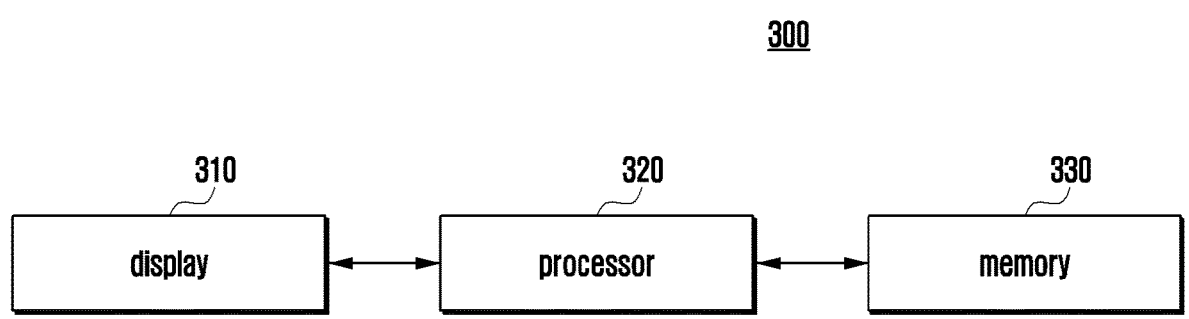
FIG. 3 is a block diagram of an electronic device according to an embodiment of the disclosure.

FIG. 3 is a block diagram of an electronic device according to an embodiment of the disclosure.

Referring to FIG. 3, an electronic device 300 (for example, the electronic device 101 of FIG. 1) according to various embodiments may include a display 310 (for example, the display device 160 of FIG. 1), a processor 320 (for example, the processor 120 of FIG. 1), and a memory 330 (for example, the memory 130 of FIG. 1).

According to various embodiments, the display 310 may operate according to a frame rate configured by the processor 320. The frame rate may be defined as a rate at which the display 310 displays one frame. The frame rate may be defined in units of frame per second (fps) which means the number of frames per second. The display 310 may display a plurality of frames generated by the processor 320 according to a configured frame rate. For example, when the processor 320 configures a frame rate of the display 310 as 120 fps, the display 310 may display 120 frames per second.

According to various embodiments, when the processor 320 configures a relatively high frame rate of the display 310, the time required for generating one frame included in a plurality of frames generated by the processor 320 may be relatively reduced. For example, when the processor 320 configures a frame rate of the display 310 as 60 fps, the processor 320 may be required to complete the generation of one frame within about 16.6 ms. In another example, when the processor 320 configures a frame rate of the display 310 as 120 fps, the processor 320 may be required to complete the generation of one frame within about 8.3 ms. Referring to the two examples, it may be noted that the time required for generating one frame is relatively reduced as the processor 320 configures a higher frame rate of the display 310.

By reducing the time required for generating one frame, the frequency of the case in which the processor 320 cannot generate the frame within the time required for generating one frame may increase. When the processor 320 cannot generate the frame within a maximum time allocated for generating one frame, the case in which a frame to be displayed on the display 310 is not normally displayed may occur and the user of the electronic device 300 may recognize disconnection of the screen, and thus the usability may deteriorate. Hereinafter, an embodiment of controlling the processor 320 or cores implemented in the processor 320 (for example, a first core 441, a second core 442, and/or an Nth core 443 of FIG. 4) for generating a plurality of frames to allow the electronic device 300 to generate the frame within the maximum time allocated for generating one frame will be described.

According to various embodiments, the processor 320 may measure a first time spent for generating one frame (hereinafter, a first frame) among a plurality of frames to be displayed on the display 310. The generation of the frame may be performed by an application manager (for example, the application manager 201 of FIG. 2) of the framework implemented in the memory 330 or a surfaceflinger of the framework. The entity for generating the frame will be described with reference to FIG. 4 below. The processor 320 may receive information on a time point of starting the generation of the frame and a time point of the ending the generation of the frame, performed by the application manager 201 or the surfaceflinger, from the application manager 201 or the surfaceflinger and identify a first time actually spent for generating a first frame. The first time spent for generating the first frame may vary depending on an amount of information or graphics included in the first frame. For example, when the amount of information included in the first frame is large or when the time spent for generating graphics increases, the first time may increase.

According to various embodiments, the processor 320 may identify a second time corresponding to a frame rate of the display 310. The second time corresponding to the frame rate may be a time maximally allocated to the generation of the first frame. For example, when the processor 320 configures the frame rate of the display 310 as 60 fps, the second time may be about 16.6 ms which is a maximum time of generating one frame. In another example, when the processor 320 configures the frame rate of the display 310 as 120 fps, the second time may be about 8.3 ms which is a maximum time of generating one frame.

According to various embodiments, the processor 320 may determine the second time on the basis of a period of a synchronization signal (Vsync) used for generating the frame by the application manager 201 or the surfaceflinger. For example, the processor 320 may identify a difference between a time at which the synchronization signal is received and a time at which the next synchronization signal is received and determine the difference as the second time. The synchronization signal will be described below with reference to FIGS. 6A and 6B.

According to various embodiments, the processor 320 may identify the second time on the basis of frame rate information received from the display 310 by a display manager implemented in a framework end.

According to various embodiments, the processor 320 may determine whether to perform an operation of controlling a plurality of cores to reduce the first time on the basis of the result of comparison between the first time and the second time.

If the first time is longer than the second time, the time spent for generating the first frame is longer than the maximum time allocated for generating the first frame. That is, it may mean that the situation in which the frame to be displayed on the display 310 cannot be normally displayed occurs. On the other hand, if the first time is shorter than the second time, the time spent for generating the first frame is shorter than the maximum time allocated for generating the first frame. That is, it may mean that the situation in which the frame to be displayed on the display 310 can be normally displayed occurs.

According to various embodiments, the processor 320 may determine to perform the operation of controlling the plurality of cores to reduce the first time in response to the identification that the first time is longer than the second time. The processor 320 may determine not to perform the operation of controlling the plurality of cores to reduce the first time in response to the identification that the first time is shorter than the second time.

According to various embodiments, the processor 320 may perform an operation of allocating a core (or a central processing unit) for processing thread related to the generation of a plurality of frames or changing an operation frequency of the allocated core in order to reduce the first time.

According to various embodiments, the processor 320 may allocate one of a plurality of cores (or central processing unit (CPU)) as a core to process a thread related to the generation of a plurality of frames in order to reduce the first time. To this end, the processor 320 may transmit the size of load of the thread to a scheduler implemented in the processor 320.

According to various embodiments, the size of load of the thread may be a value indicating a usage amount, a usage weight, or a usage rate of the thread used by the processor 320.

According to various embodiments, when determining a core to process the thread related to the generation of a plurality of frames, the scheduler (not shown) may calculate the size of load of the thread related to the generation of the plurality of frames. The scheduler may determine the core to process the thread related to the generation of the plurality of frames on the basis of a sum of the size of load of the thread related to the generation of the plurality of frames and the size of load of the thread related to a task different from the generation of frames. The scheduler may be implemented in a kernel of an operating system (for example, the operating system 142 of FIG. 2), and the first time and the second time may be identified by an end of the framework (for example, the middleware 144 of FIG. 2) which is a higher layer of the kernel, and this it may be difficult to transmit information on the first time and the second time from the framework to the kernel. In this case, an amount of load of the thread related to the generation of frames calculated by the scheduler may be inaccurate information to be allocated to a core which may reduce the first time or inaccurate information to control an operation frequency of the core.

According to various embodiments, the processor 320 may transmit the information on the first time and the second time calculated by the end of the framework (for example, the application manager 201 or the surfaceflinger) to a load calculation unit implemented in an end of the kernel. The load calculation unit may determine a corrected value of the size of load of the thread on the basis of a ratio between the first time and the second time. The corrected value of the size of load of the thread may be a value obtained by correcting (or increasing) the size of load such that the first time is shorter than the second time. An embodiment of transmitting information related to the first time and the second time from the framework to the kernel will be described below with reference to FIG. 4.

According to various embodiments, the processor 320 may determine a value obtained by multiplying the size of average load of the thread related to the generation of the frame and a ration between the first time and the second time (first time/second time) as the corrected size of load the thread. The size of the average load of the thread related to the generation of the frame may be the size of the average load of the thread related to the generation of the first frame or may be the size of the average load of the thread related to the generation of previous frames including the first frame.

According to various embodiments, the processor 320 may correct the size of the load of the thread and allocate cores on the basis of the corrected size of the load. When the corrected size of the load is larger than the size of the load calculated by the scheduler, the electronic device 300 may perform thread processing using a core having a higher performance than the core determined on the basis of the load of the thread calculated by the scheduler and complete the generation of the frame during a time shorter than a maximum time (second time) allocated for generating one frame.

According to various embodiments, the processor 320 may correct the size of the load of the thread and control (or change) an operation frequency of the allocated core using the corrected size of the load. The processor 320 may transmit the corrected size of the load to a governor for controlling the operation frequency. The governor may operate the core with an operation frequency higher than the operation frequency determined on the basis of the load of the thread calculated by the scheduler and complete the generation of the frame during a time shorter than the maximum time (second time) allocated for generating one frame.

According to various embodiment, the processor 320 may identify the corrected size of the load (hereinafter, defined as a first load size) and the size of the load calculated by the scheduler (hereinafter, defined as a second load size). The processor 320 may compare the first load size with the second load size and use a larger load size for processing the thread related to the generation of a plurality of frames. According to an embodiment, the scheduler may identify the first load size transmitted by the load calculation unit and determine (or change) a core to process the thread using a larger value between the first load size and the second load size. The governor may control (or change) the operation frequency of the core to process the thread using the load size used by the scheduler.

According to various embodiments, when determining whether to perform an operation of controlling a core for reducing the first time among the above-described operations, the processor 320 may determine the same on the basis of a characteristic of an application corresponding to a plurality of frames. According to an embodiment, the processor 320 may identify whether an application making a request for generating a plurality of frames is a foreground application or a background application. The processor 320 may determine to perform the operation of controlling the core for reducing the first time in response to identification that the application is the foreground application. The processor 320 may determine not to perform the operation of controlling the core for reducing the first time in response to identification that the application is the background application.

According to various embodiments, the foreground application may be an application for performing a task displayed on the display. For example, the foreground application may be an application for performing a task displayed on the display and receiving a user input (or a user interaction).

According to various embodiments, the background application may be an application for performing a task which is not displayed on the display. For example, the background application may be an application for performing a task which is not displayed on the display and not receiving a user input (or a user interaction).

According to various embodiments, at least one of the plurality of frames may be frames including two or more subframes having different frame rates. For example, a frame corresponding to an image reproduction application may include all of an area displaying an image and an area displaying information related to the image, and a frame rate of the area displaying the image may be different from a frame rate of the area displaying the information related to the image. In this case, for each of the plurality of subframes, the processor 320 may determine whether to perform the operation of controlling the core for reducing the first time.

The above-described embodiments may be embodiments related to the generation of a plurality of frames after the first frame. According to various embodiments, the operations may be performed for the generation of the first frame.

According to various embodiments, the processor 320 may identify a progress level of the generation of the first frame at every preset time while the operation of generating the first frame is performed, and determine whether to perform an operation of controlling the plurality of cores for reducing the first time on the basis of the progress level of the generation of the first frame. The progress level of the generation of the first frame may be used to determine whether the first time spent for generating the first frame is longer than or equal to the second time. An embodiment related to the generation of the first frame will be described below with reference to FIG. 5.

Figure 4:
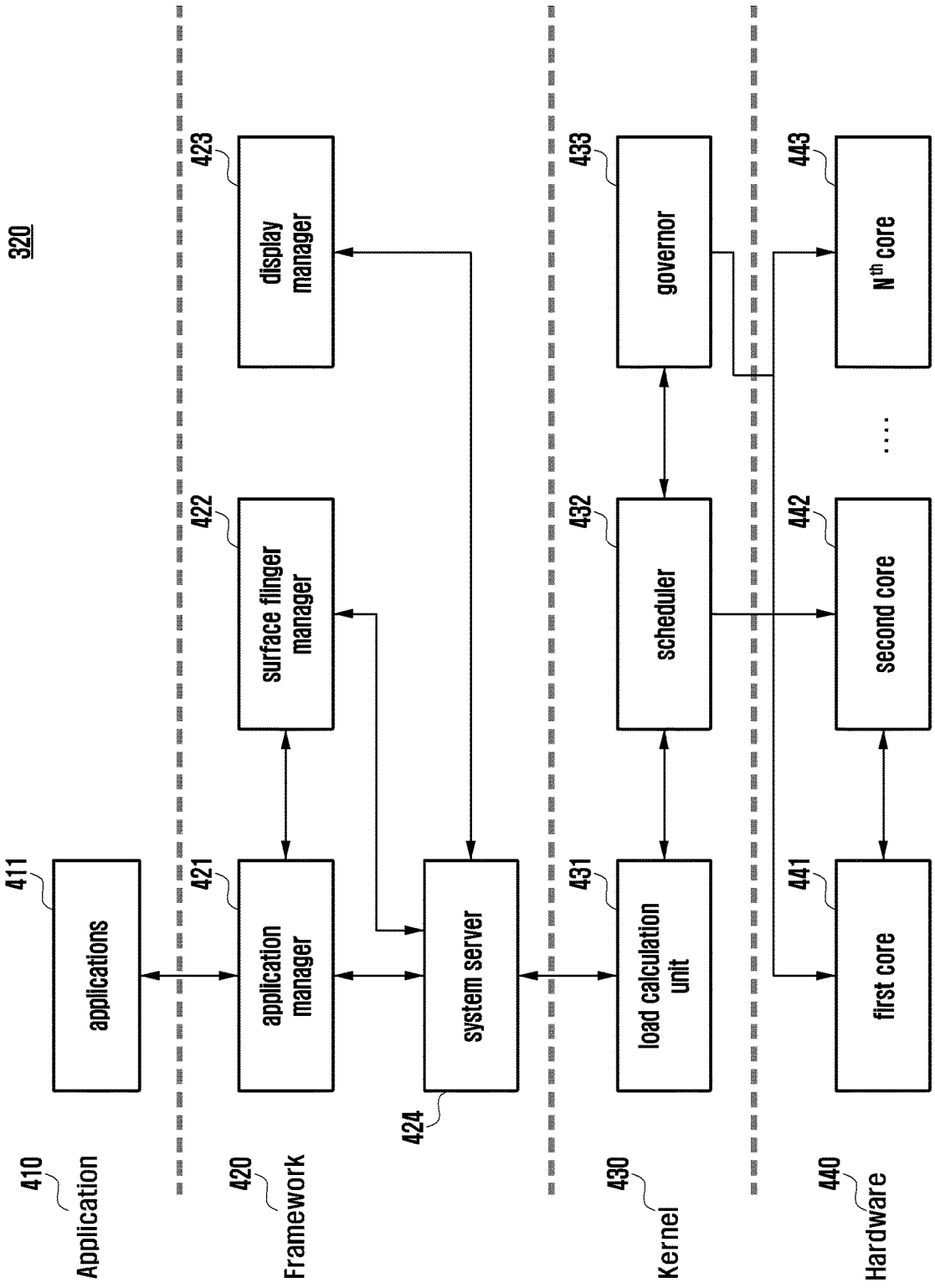
FIG. 4 illustrates software layers of an electronic device according to an embodiment of the disclosure.

FIG. 4 illustrates software layers of an electronic device according to an embodiment of the disclosure.

The program 140 (for example, the program 140 of FIG. 1) and the processor 320 of an electronic device (for example, the electronic device 300 of FIG. 3) may be implemented by an application layer 410, a framework layer 420, a kernel layer 430, and a hardware layer 440.

Referring to FIG. 4, the application layer 410 may include various applications 411 (for example, the application 146 of FIG. 1) installed in a memory (for example, the memory 330 of FIG. 3) of the electronic device 300. The applications 411 illustrated in FIG. 4 may be foreground applications and may make a request for generating a plurality of frames to the framework layer 420 in response to execution of functions of the applications 411.

According to various embodiments, the framework layer 420 is a layer in which elements for performing processing corresponding to the request from the applications 411 are implemented in response to the request from the applications 411 and may perform processing using resources provided by elements included in the hardware layer 440 implemented below the framework layer 420. The framework layer 420 may include an application manager 421 (for example, the application manager 201 of FIG. 2), a surfaceflinger 422, a display manager 423, and a system server 424.

According to various embodiments, the application manager 421 may perform an operation of generating a plurality of frames in response to the request from the applications 411. The application manager 421 may generate a plurality of frames using data related to the applications 411 stored in the memory 130. The application manager 421 may generate a plurality of frames using a user interface renderer (GUI) implemented in software or a user interface renderer (HWUI) implemented in hardware. The application manager 421 may receive thread related to the generation of a plurality of frames and store identification information of the received thread (thread identification (TID)).

According to various embodiments, the application manager 421 may group and manage threads related to the generation of a plurality of frames. According to an embodiment, the application manager 421 may group threads related to respective frames of which the generation is requested by the same application as the same group and manage the groups. The application manager 421 may manage thread identifiers and information on the first time spent for generating the first frame.

According to various embodiments, the surfaceflinger 422 may generate a plurality of frames to be displayed on a display (for example, the display 310 of FIG. 3) by combining a frame layer generated using system UI thread and a frame layer generated by the application manager 421.

According to various embodiments, the display manager 423 may be dynamically connected to the display 310 and may receive state information of the display 310 (for example, a scan rate of the display 310) from the display 310.

According to various embodiments, the system server 424 may exchange data between the framework layer 420 and the kernel layer 430.

According to various embodiments, the system server 424 may receive the thread identifier and first time information from the application manager 421. The system server 424 may receive second time information from the application manager 421 or the display manager 423. The system server 424 may transmit the thread identifier, the first time information, and/or the second time information to the load calculation unit 431 of the kernel layer 430.

According to various embodiments, the system server 424 may identify whether an application corresponding to the thread identifier is a foreground application or a background application.

According to various embodiments, the foreground application may be an application for performing a task displayed on the display. For example, the foreground application may be an application for performing a task displayed on the display and receiving a user input (or a user interaction).

According to various embodiments, the background application may be an application for performing a task which is not displayed on the display. For example, the background application may be an application for performing a task which is not displayed on the display and not receiving a user input (or a user interaction).

According to various embodiments, the system server 424 may transmit a signal making a request for calculating load to the load calculation unit 431 in response to identification that the application is the foreground application. The system server 424 may not transmit a signal making a request for calculating load to the load calculation unit 431 in response to identification that the application is the background application.

According to various embodiments, the kernel layer 430 is a layer existing between the framework layer 420 and the hardware layer 440, and may allocate threads of which processing is requested by the framework layer 420 to the hardware layer 440 and include elements for controlling elements included in the hardware layer 440. The kernel layer 430 may include the load calculation unit 431, the scheduler 432, and/or the governor 433.

According to various embodiments, the load calculation unit 431 may receive the thread identifier, the first time information, and the second time information through the system server 424. The load calculation unit 431 may compare the first time and the second time in response to reception of the signal making a request for calculating load, transmitted from the system server 424. The load calculation unit 431 may compare the first time and the second time and determine to perform the operation of controlling a plurality of cores for reducing the first time in response to identification that the first time is longer than or equal to the second time.

According to various embodiments, the load calculation unit 431 may calculate the size of load of the thread related to the generation of a plurality of frames (for example, the first frame and a frame different from the first frame and generated earlier than the first frame) as a portion of the operation of controlling the plurality of cores for reducing the first time. The load calculation unit 431 may determine a corrected value of the size of load of the thread on the basis of a ratio between the first time and the second time. The corrected value of the size of load of the thread may be a value obtained by correcting (or increasing) the load such that the first time is shorter than the second time.

According to various embodiments, the load calculation unit 431 may determine a value obtained by multiplying the average size of loads of the thread related to the generation of the frame and the ratio between the first time and the second time (first time/second time) as the corrected value of the size of the load of the thread. The average value of the sizes of the load of the thread related to the generation of the frame may be an average value of sizes of the load of the thread related to the generation of the first frame or may be an average value of sizes of the load of the thread related to the generation of previous frames including the first frame.

According to various embodiments, when determining the corrected value of the size of the load of the thread, the load calculation unit 431 may additionally consider a margin considering a time spent for transmitting the generated frame to the display 310 and/or a time spent for processing the generated frame by a display driver integrated circuit of the display 310 According to an embodiment, the load calculation unit 431 may determine a value obtained by multiplying a ratio between a difference value between the second time and the margin and the first time ((first time)/(second time-margin)) by the size value of average load of the thread related to the generation of the frame as the corrected value of the size of the load of the thread. The load calculation unit 431 may transmit the calculated corrected value of the size of the load to the scheduler 432.

According to various embodiments, the scheduler 432 may perform an operation of allocating cores 441, 442, and 443 to process thread related to the generation of the frame on the basis of the size of load of the thread related to the generation of the frame and/or the size of load of the thread related to another task. The scheduler 432 may identify the corrected size of the load (hereinafter, defined as a first load size) and the size of the load calculated by the scheduler 432 (hereinafter, defined as a second load size). The scheduler 432 may compare the first load size and the second load size and use a larger load size for processing thread related to the generation of a plurality of frames. According to an embodiment, the scheduler 432 may identify the first load size transmitted by the load calculation unit and determine (or change) a core to process the thread using a larger value between the first load size and the second load size.

According to various embodiments, the governor 433 may determine (or change) an operation frequency of the core allocated by the scheduler 432 on the basis of the size of the load of the thread related to the generation of the frame and/or the size of the load of the thread related to another task. The governor 433 may control (or change) the operation frequency of the core to process the thread using the load size (larger value between the first load size and the second load size) used by the scheduler 432.

According to various embodiments, the hardware layer 440 is a layer implemented in the processor 320, and may include hardware elements for processing thread transmitted by the kernel layer 430. According to an embodiment, the hardware layer 440 may include a first core 441, a second core 442, and/or an $N^{th}$ core 443. The scheduler 432 may allocate (or change) the core to process the thread related to the generation of the frame among the first core 441, the second core 442, and/or the $N^{th}$ core 443, and the first core 441, the second core 442, and/or the $N^{th}$ core 443 may process the thread related to the generation of the frame while operating according to the operation frequency determined by the governor 433.

Figure 5:
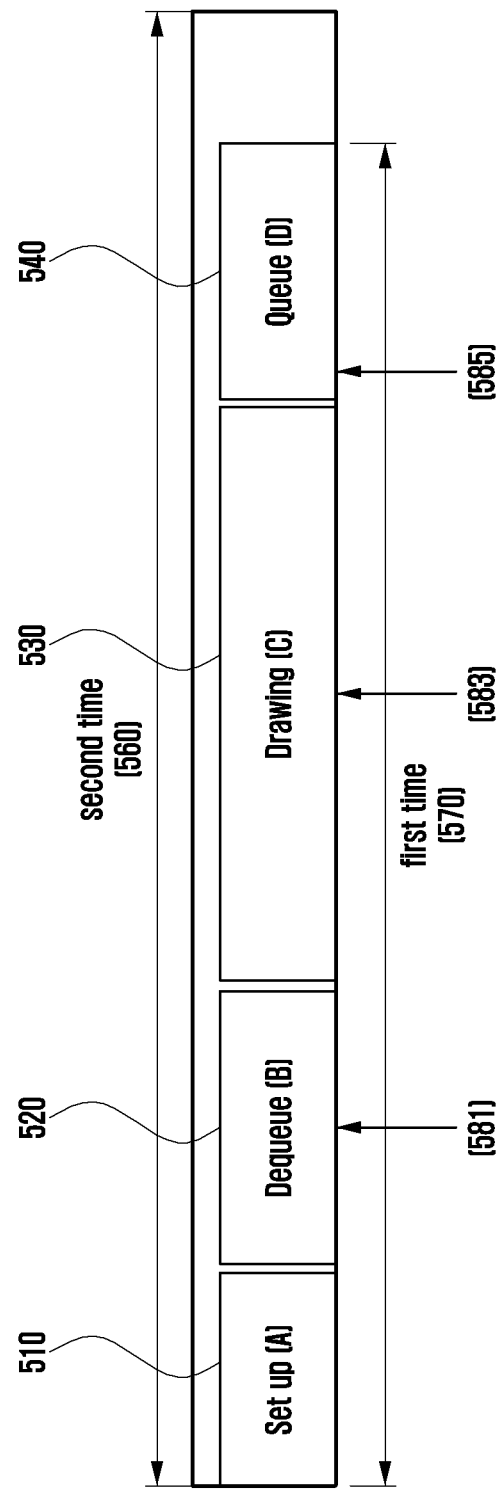
FIG. 5 illustrates an embodiment in which an electronic device controls an operation of a core while generating a frame to be first displayed according to an embodiment of the disclosure.

FIG. 5 illustrates an embodiment in which an electronic device controls an operation of a core while generating a frame to be first displayed according to an embodiment of the disclosure.

According to various embodiments, an electronic device (for example, the electronic device 300 of FIG. 3) may identify a progress level of the generation of the first frame at every preset time while performing an operation of generating the first frame and determine whether to perform the operation of controlling the plurality of cores for reducing the first time on the basis of the progress level of the generation of the first frame.

FIG. 5 illustrates a progress operation of the generation of a first frame. Referring to FIG. 5, a process of generating the first frame may largely include a configuration operation 510, a dequeue operation 520, a drawing operation 530, and a queue operation 540.

According to various embodiments, an application manager (for example, the application manager 421 of FIG. 4) may load information required for generating the first frame (for example, a code used for generating the first frame) stored in a memory (for example, the memory 330 of FIG. 3) in the configuration operation 510.

According to various embodiments, the application manager 421 may make a request for a buffer to temporarily store data required for generating the first frame to a surfaceflinger (for example, the surfaceflinger 422 of FIG. 4) in the dequeue operation 520.

According to various embodiments, the application manager 421 may generate the first frame on the basis of information required for generating the first frame in the drawing operation 530.

According to various embodiments, the application manager 421 may store data related to the generated first frame in the buffer in the queue operation 540.

According to various embodiments, the electronic device 300 may predict whether a first time 570 spent for generating the first frame is longer than or equal to a second time 580 on the basis of the progress level of the generation of the first frame.

According to various embodiments, the electronic device 300 may store data for mapping entry operations to preset times 581, 583, and 585 in the memory 330. For example, the electronic device 300 may store data indicating the preset first time 581 and the dequeue operation 520, data indicating the preset second time 583 and the drawing operation 530, and/or data indicating the preset third time 585 and the queue operation 540 in the memory 130.

According to various embodiments, the electronic device 300 may identify a progress operation at every preset time 581, 583, or 585 and identify whether the progress operation matches the mapped operation. The electronic device 300 may determine to perform the operation of controlling the core for reducing the first time illustrated in FIGS. 3 and 4 in response to identification that the progress operation precedes the mapped operation.

According to various embodiments, the electronic device 300 may implement the first time spent for generating the first frame to be shorter than the second time by configuring (or changing) a relatively higher operation frequency of the core or allocating (or changing) the core to process the thread related to drawing to a core to provide relatively higher performance.

Figure 6A:
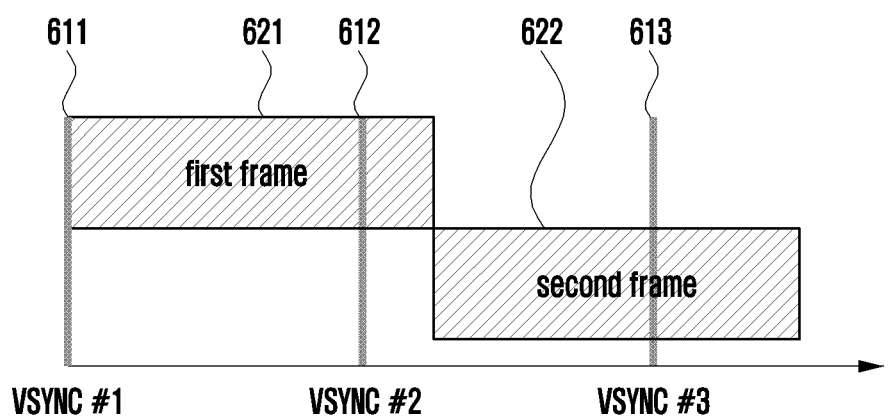
FIGS. 6A and 6B illustrate a generation time of a frame generated on the basis of the result of controlling an operation frequency based on a first time and a second time by an electronic device and a comparative example according to various embodiments of the disclosure.
Figure 6A:
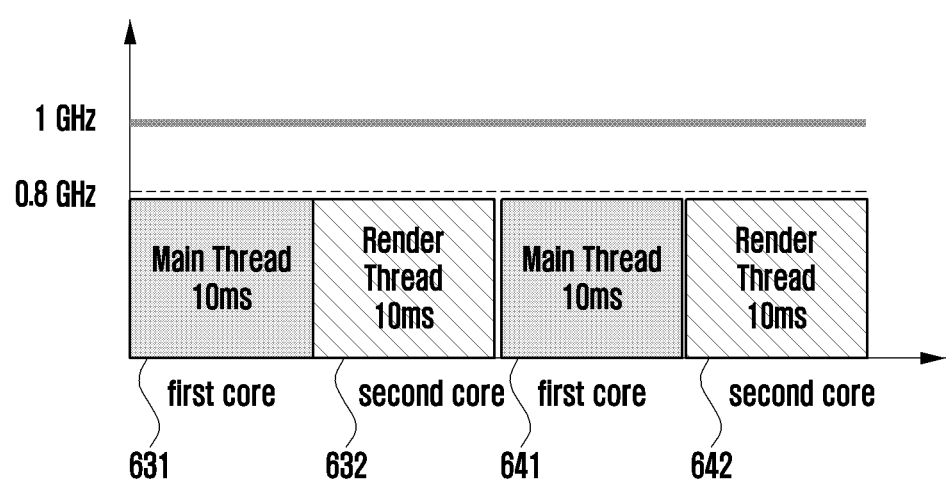
Figure 6B:
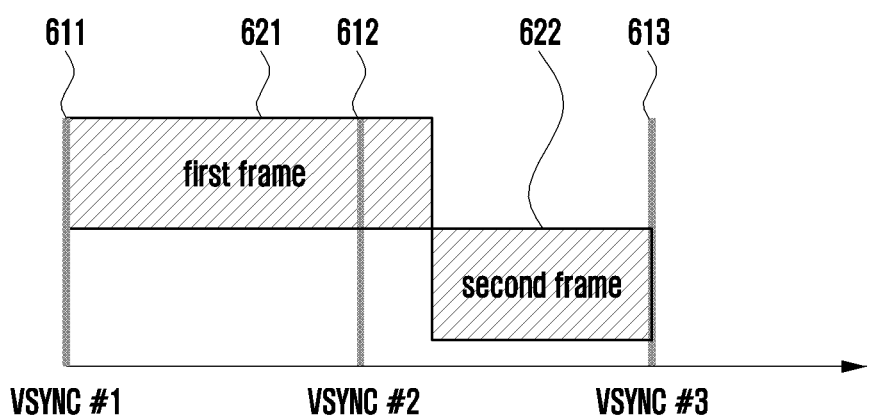
Figure 6B:
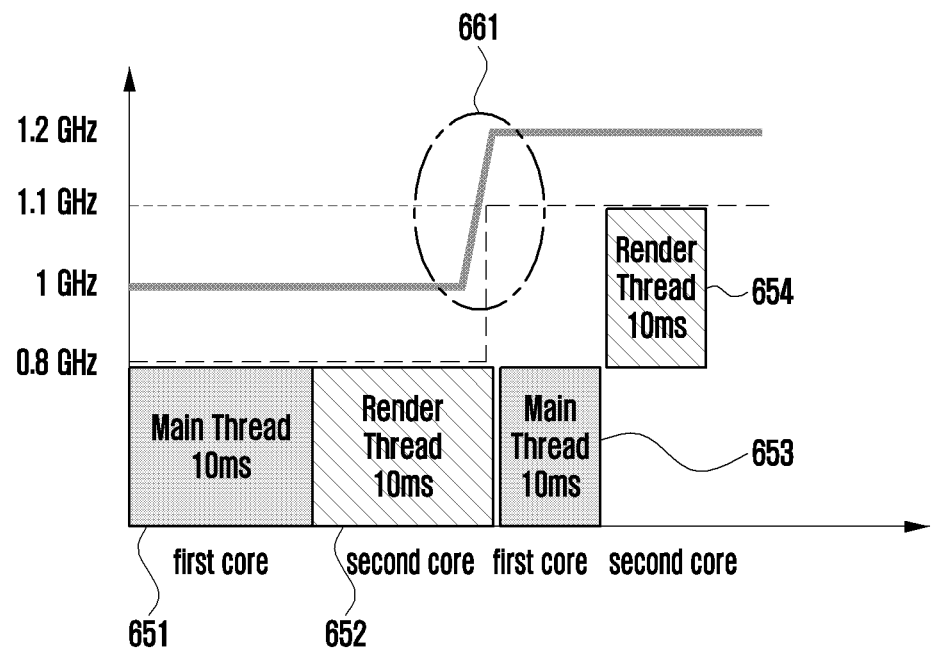

FIGS. 6A and 6B illustrate a generation time of a frame generated on the basis of the result of controlling an operation frequency based on a first time and a second time by an electronic device and a comparative example according to various embodiments of the disclosure.

FIG. 6A illustrates that an electronic device which does not perform the operation of controlling a core for reducing the first time generates a first frame and a second frame which is a follow-up frame of the first frame according to the comparative example of the disclosure.

Referring to FIG. 6A, the electronic device according to the comparative example may generate a first frame 621 in response to generation of a first synchronization signal 611. The first frame 621 may be a frame having a first time spent for generating the first frame 621, longer than equal to a second time which is a maximum time allocated for generating the first frame 621 (a time between the first synchronization signal 611 and a second synchronization signal 612 or a time between the second synchronization signal 612 or a third synchronization signal 613).

According to the comparative example, the electronic device may not control a separate core for reducing the first time (not increase the operation frequency of the core or not allocate thread related to generation of the frame to a core having relatively better performance). Referring to FIG. 6A, the electronic device may process threads 631 and 632 related to the operation of generating the first frame 621 and threads 641 and 642 related to the operation of generating the second frame 622 in the state in which the existing operation frequency (for example, 1 GHz) is maintained.

When the first time spent for generating the first frame is longer than or equal to the second time which is the maximum time allocated for generating the first frame 621 (the time between the first synchronization signal 611 and the second synchronization signal 612 or the time between the second synchronization signal 612 and the third synchronization signal 613), a time at which the first frame 621 is completely generated may be after the generation of the second synchronization signal 612. Referring to FIG. 6A, it may be identified that the first frame 621 which should be completely generated before the generation of the second synchronization signal 612 is completely generated after the generation of the second synchronization signal 612. A time at which the generation of the second frame 622 starts may be later due to the time spent for generating the first frame 621, and it may be identified that the second frame 622 which should be completely generated before the generation of the third synchronization signal 613 is completely generated after the generation of the third synchronization signal 613.

Such a situation may be a case in which the electronic device cannot generate the first frame 621 within the maximum time allocated for generating one frame, and a situation in which a frame to be displayed on the display cannot be normally displayed may occur. The user of the electronic device may recognize disconnection of the screen, and thus the usability may deteriorate.

FIG. 6B illustrates that the electronic device performing an operation of controlling a core for reducing a first time generates a first frame and a second frame which is a follow-up frame of the first frame according to various embodiments.

Referring to FIG. 6B, an electronic device (for example, the electronic device 300 of FIG. 3) according to various embodiments may generate the first frame 621 in response to generation of the first synchronization signal 611 The first frame 621 may be a frame having a first time spent for generating the first frame 621, longer than or equal to a second time which is the maximum time (the time between the first synchronization signal 611 and the second synchronization signal 612) allocated for generating the first frame 621.

Referring to FIG. 6B, the electronic device 300 may process threads 651 and 652 related to the operation of generating the first frame 621 while controlling the core to operate according to a specific operation frequency (for example, 1 GHz) before a change in the operation frequency. It may be identified that the first frame 621 which should be completely generated before the generation of the second synchronization signal 612 is completely generated after the generation of the second synchronization signal 612.

According to various embodiments, the electronic device 300 may determine to perform the operation of controlling the plurality of cores for reducing the first time in response to identification that the first time is longer than or equal to the second time.

According to various embodiments, the electronic device 300 may perform an operation of allocating a core (or a central processing unit) for processing thread related to the generation of the plurality of frames or changing an operation frequency of the allocated core in order to reduce the first time.

According to various embodiments, the electronic device 300 may correct the size of load of the thread related to the generation of the plurality of frames and change the operation frequency on the basis of the corrected value of the size of the load. The corrected value of the size of load of the thread may be a value obtained by correcting (or increasing) the size of load such that the first time is shorter than the second time.

Referring to reference numeral 661 of FIG. 6B, the electronic device 300 may control the core to operate according to an operation frequency (for example, 1.2 GHz) relatively higher than the existing operation frequency (for example, 1 GHz). The electronic device 300 may process threads 653 and 654 related to the operation of generating the second frame 622 on the relatively higher operation frequency.

According to various embodiments, the second frame 622 may be generated on the relatively higher operation frequency, and thus the time (first time) spent for generating the second frame 622 may be reduced. Referring to FIG. 6B, the first frame 621 may be completely generated after the generation of the second synchronization signal 612 and thus the time at which the generation of the second frame 622 starts may be later, but it may be identified that the second frame 622 is completely generated before the generation of the third synchronization signal 613 due to a change in the operation frequency based on the correction of the size of the load of the thread related to the generation of the frame.

An electronic device according to various embodiments may include: a memory; a display; and a processor including a plurality of cores generating a plurality of frames including a first frame and a second frame, wherein the processor is configured to identify a first time spent for generating the first frame to be displayed on the display and a second time corresponding to a frame rate of the display, determine whether to perform an operation of controlling the plurality of cores for reducing a time for generating the second frame on the basis of a result of comparison between the first time and the second time, determine a size of a load for processing a thread related to generation of the second frame on the basis of a ratio between the first time and the second time, in response to the determination to perform the operation of controlling the cores, allocate at least one of the plurality of cores as cores to process the thread on the basis of the determined size of the load, determine an operation frequency of the cores on the basis of the determined size of the load, and control the cores to generate the second frame according to the determined operation frequency.

In the electronic device according to various embodiments, the processor may be configured to determine a first size of the load for processing the thread for generating the second frame on the basis of a size of a load of a thread related to generation of another frame generated earlier than the first frame and the ratio between the first time and the second time, identify a second size of a load for processing a thread for generating the second frame calculated by a scheduler implemented in the memory, and determine a larger size between the first size and the second size as the size of the load for processing the thread for generating the second frame.

In the electronic device according to various embodiments, the electronic device may include a framework configured to generate the plurality of frames; and a kernel configured to allocate resources for generating the plurality of frames, wherein the framework transmits the first time and the second time to the kernel, and the kernel includes: a load calculation unit configured to determine the first size for generating the second frame on the basis of the result of the comparison between the first time and the second time; and a governor configured to determine an operation frequency of a core on the basis of the determined size.

In the electronic device according to various embodiments, the scheduler may be configured to determine a larger size between the first size and the second size as the determined load for processing the thread corresponding to the second frame and determine a core to process the thread for generating the second frame on the basis of the determined load.

In the electronic device according to various embodiments, the processor may be configured to change the core allocated as the core to process the thread for generating the second frame into another core on the basis of a size of the determined load.

In the electronic device according to various embodiments, the processor may be configured to identify whether an application for generating the first frame is a foreground application and determine whether to perform the operation of controlling the plurality of cores for reducing the first time in response to identification that the application is a foreground application.

In the electronic device according to various embodiments, the processor may be configured to identify, when the first frame is a frame to be first displayed among the plurality of frames, a progress level of an operation for generating the first frame at every preset time while the first frame is generated and determine whether to perform the operation of controlling the plurality of cores for reducing the first time on the basis of the process level of the operation of generating the first frame.

In the electronic device according to various embodiments, the processor may be configured to identify whether the time spent for generating the first frame is longer than or equal to the second time on the basis of the progress level of the operation for generating the first frame and determine whether to perform the operation of controlling the plurality of cores for reducing the first time in response to identification that the time spent for generating the first frame is longer than or equal to the second time.

In the electronic device according to various embodiments, the first frame may include two or more subframes having different frame rates, and the processor may be configured to determine whether to perform the operation of controlling the plurality of cores for reducing the first time in every subframe.

In the electronic device according to various embodiments, the processor may be configured to determine the operation frequency of the cores such that the first time is equal to or shorter than the second time.

Figure 7:
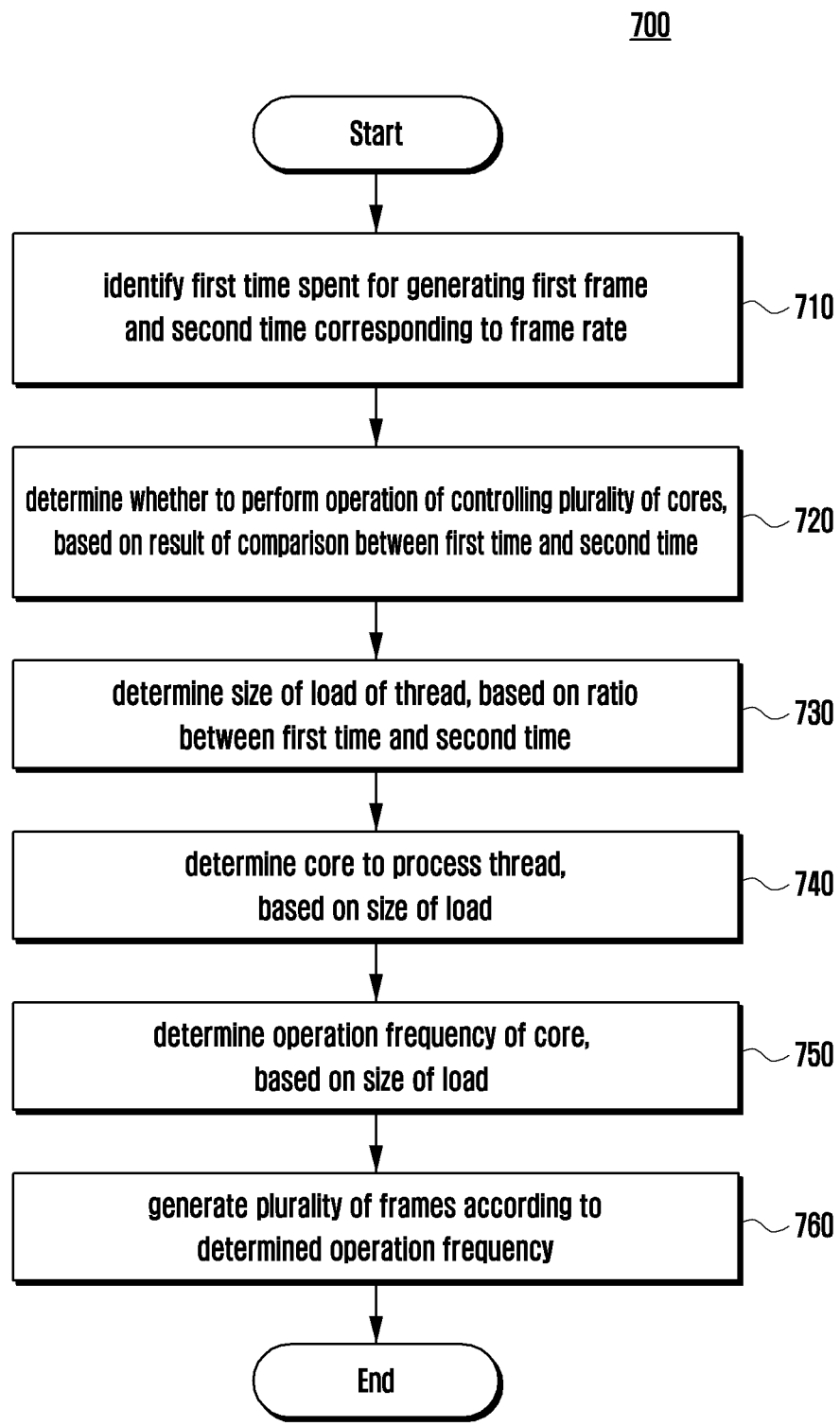
FIG. 7 is a flowchart illustrating a method of operating an electronic device according to an embodiment of the disclosure.

FIG. 7 is a flowchart illustrating a method of operating an electronic device according to an embodiment of the disclosure.

Referring to FIG. 7 and the method 700, an electronic device (for example, the electronic device 300 of FIG. 3) may identify a first time (for example, the first time 570 of FIG. 5) spent for generating a first frame and a second time (for example, the second time 560 of FIG. 5) corresponding to a frame rate of a display (for example, the display 310 of FIG. 3) in operation 710.

According to various embodiments, the electronic device 300 may measure the first time 570 spent for generating one frame (hereinafter, referred to as a first frame) among a plurality of frames to be displayed on the display 310. The electronic device 300 may receive information on a time point at which the generation of the frame starts and a time point at which the generation of the frame ends by an application manager (for example, the application manager 421 of FIG. 4) or a surfaceflinger (for example, the surfaceflinger 422 of FIG. 4) from the application manager 421 or the surfaceflinger 422, and identify the first time 570 spent for actually generating the first frame.

According to various embodiments, the electronic device 300 may identify the second time 560 corresponding to a frame rate of the display 310. The second time corresponding to the frame rate may be a time maximally allocated to the generation of the first frame.

According to various embodiments, the electronic device 300 may determine the second time on the basis of periods of Vsync which are synchronization signals (for example, the first synchronization signal 611, the second synchronization signal 612, and the third synchronization signal 613 of FIGS. 6A and 6B) used for generating the frame by the application manager 421 or the surfaceflinger 422. For example, the electronic device 300 may identify a difference between the time at which the synchronization signals 611, 612, and 613 are received and the time at which the next synchronization signals 611, 612, and 613 are received and determine the difference as the second time 560.

According to various embodiments, the electronic device 300 may identify the second time 560 on the basis of frame rate information received from the display 310 by a display manager (for example, the display manager 423 of FIG. 4).

According to various embodiments, the electronic device 300 may determine whether to perform the operation of controlling a plurality of cores implemented in a processor (for example, the processor 320 of FIG. 3) on the basis of the result of comparison between the first time 570 and the second time 560 in operation 720.

According to various embodiments, the electronic device 300 may determine to perform the operation of controlling the plurality of cores for reducing the first time in response to identification that the first time is longer than the second time. The processor 320 may determine not to perform the operation of controlling the plurality of cores to reduce the first time in response to the identification that the first time is shorter than the second time.

According to various embodiments, the electronic device 300 may determine the size of load of the thread related to the generation of the plurality of frames on the basis of a ratio between the first time 570 and the second time 560 in operation 730.

According to various embodiments, the electronic device 300 may transmit information on the first time 570 and the second time 560 calculated by the application manager 421 or the surfaceflinger 422 implemented in the end of a framework (for example, the framework layer 420 of FIG. 4) to a load calculation unit (for example, the load calculation unit 431 of FIG. 4) implemented in the end of the kernel. The load calculation unit 431 may determine a corrected value of the size of load of the thread on the basis of the ratio between the first time 570 and the second time 560. The corrected value of the load of the thread may be a value obtained by correcting (or increasing) the size of the load such that the first time 570 is shorter than the second time 560.

According to various embodiments, the electronic device 300 may determine a value obtained by multiplying the size of average load of the thread related to the generation of the frame by the ration between the first time 570 and the second time 560 (first time/second time) as the corrected value of the size of the load of the thread. The average value of the sizes of load of the thread related to the generation of the frame may be an average value of sizes of load of the thread related to the generation of the first frame or may be an average value of sizes of load of the thread related to the generation of previous frames including the first frame.

According to various embodiments, the electronic device 300 may determine a core (for example, the first core 441, the second core 442, or the third core 443 of FIG. 4) to process the thread on the basis of the size of load in operation 740.

According to various embodiments, the electronic device 300 may process the thread using a core having higher performance than the core determined on the basis of the load of the thread calculated by a scheduler (for example, the scheduler 432 of FIG. 4) by correcting the size of the load of the thread and allocating the cores 441, 442, and 443 on the basis of the corrected size of the load, and may complete the generation of the frame during a time shorter than a maximum time (second time) allocated for generating one frame.

According to various embodiments, the electronic device 300 may determine an operation frequency of the core on the basis of the size of the load in operation 750.

According to various embodiments, the electronic device 300 may correct the size of the load of the thread and control (or change) the operation frequency of the allocated cores 441, 442, and 443 using the corrected size of the load. The electronic device 300 may transmit the corrected size of the load to a governor (for example, the governor 433 of FIG. 4) for controlling the operation frequency. The governor 433 may operate the cores 441, 442, and 443 with an operation frequency higher than the operation frequency determined on the basis of the load of the thread calculated by the scheduler and complete the generation of the frame during a time shorter than a maximum time (second time) allocated for generating one frame.

According to various embodiments, the electronic device 300 may generate a plurality of frames according to the determined operation frequency in operation 760.

A method of operating an electronic device according to various embodiments may include: an operation of identifying a first time spent for generating a first frame among a plurality of frames including the first frame and a second frame to be displayed on a display of the electronic device and a second time corresponding to a frame rate of the display; an operation of determining whether to perform an operation of controlling the plurality of cores implemented in a processor of the electronic device for reducing a time for generating the second frame on the basis of a result of comparison between the first time and the second time; an operation of determining a size of a load for processing a thread related to generation of the second frame on the basis of a ratio between the first time and the second time, in response to the determination to perform the operation of controlling the cores; an operation of allocating at least one of the plurality of cores as cores to process the thread on the basis of the determined size of the load; an operation of determining an operation frequency of the cores on the basis of the determined size of the load; and an operation of controlling the cores to generate the second frame according to the determined operation frequency.

In the method of operating the electronic device according to various embodiments, the operation of determining the size of the determined load may include an operation of determining a first size of the load for processing the thread for generating the second frame on the basis of a size of a load of a thread related to generation of another frame generated earlier than the first frame and the ratio between the first time and the second time; an operation of identifying a second size of a load for processing a thread for generating the second frame calculated by a scheduler implemented in the memory; and an operation of determining a larger size between the first size and the second size as the size of the load for processing the thread corresponding to the second frame.

The method of operating the electronic device according to various embodiments may further include an operation of transmitting the first time and the second time to a kernel allocating resources for generating the plurality of frames by a framework generating the plurality of frames.

The method of operating the electronic device according to various embodiments may further include an operation of determining a core to process the thread on the basis of the size of the determined load.

The method of operating the electronic device according to various embodiments may further include an operation of changing the core allocated as the core to process the thread into another core on the basis of the size of the determined load.

The method of operating the electronic device according to various embodiments may further include an operation of identifying whether an application for generating the first frame is a foreground application; and an operation of determining whether to perform the operation of controlling the plurality of cores for reducing the first time in response to identification that the application is a foreground application.

The method of operating the electronic device according to various embodiments may further include an operation of, when the first frame is a frame to be first displayed among the plurality of frames, identifying, a progress level of an operation for generating the first frame at every preset time while the first frame is generated; and an operation of determining whether to perform the operation of controlling the plurality of cores for reducing the first time on the basis of the process level of the operation for generating the first frame.

The method of operating the electronic device according to various embodiments may further include an operation of identifying whether the time spent for generating the first frame is longer than or equal to the second time on the basis of the progress level of the operation for generating the first frame; and an operation of determining whether to perform the operation of controlling the plurality of cores for reducing the first time in response to identification that the time spent for generating the first frame is longer than or equal to the second time.

In the method of operating the electronic device according to various embodiments, the first frame may include two or more subframes having different frame rates, the method, and the method may further include an operation of determining whether to perform the operation of controlling the plurality of cores for reducing the first time in every subframe.

In the method of operating the electronic device according to various embodiments, the operation of determining the operation frequency of the cores may include an operation of determining the operation frequency of the cores such that the first time is equal to or shorter than the second time.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. An electronic device comprising:
a memory;
a display; and
a processor comprising a plurality of cores generating a plurality of frames comprising a first frame and a second frame, and a scheduler determining a size of a load for processing a thread related to generation of the first frame and the second frame
wherein the processor is configured to:
measure a first time taken to generate the first frame while the first frame is generated and store the first frame in a buffer for displaying on the display,
identify a second time corresponding to a frame rate of the display,
when the first time is less than the second time:
allocate at least one of the plurality of cores as cores to process the thread, based on the determined size of the load for processing the thread related to generation of the second frame,
determine an operation frequency of the cores, based on the determined size of the load, and
control the cores to operate at the determined operation frequency while generating the second frame,
when the first time is more than the second time:
determine to perform an operation of controlling the plurality of cores for reducing a time for generating the second frame,
correct the size of a load for processing the thread related to generation of the second frame, based on multiplying the size of the load and a ratio between the first time and the second time,
allocate at least one of the plurality of cores as cores to process the thread, based on the corrected size of the load,
determine an operation frequency of the cores, based on the corrected size of the load, and
control the cores to operate at the determined operation frequency while generating the second frame.

2. The electronic device of claim 1, wherein the processor is further configured to: determine a first size of the load for processing the thread for generating the second frame, based on a size of a load of a thread related to generation of another frame generated earlier than the first frame and the ratio between the first time and the second time, identify a second size of a load for processing a thread for generating the second frame calculated by the scheduler, and determine a larger size between the first size and the second size as the size of the load for processing the thread for generating the second frame.

3. The electronic device of claim 2, wherein the electronic device further comprises: a framework configured to generate the plurality of frames; and a kernel configured to allocate resources for generating the plurality of frames, wherein the framework transmits the first time and the second time to the kernel, and wherein the kernel comprises: a load calculation circuitry configured to determine the first size for generating the second frame, based on a result of a comparison between the first time and the second time; and a governor configured to determine an operation frequency of a core, based on the determined size of the load.

4. The electronic device of claim 2, wherein the scheduler is configured to: determine a larger size between the first size and the second size as the determined size of the load for processing the thread corresponding to the second frame, and determine a core to process the thread for generating the second frame, based on the determined size of the load.

5. The electronic device of claim 1, wherein the processor is further configured to change the core allocated as the core to process the thread for generating the second frame into another core, based on the determined size of the load.

6. The electronic device of claim 1, wherein the processor is further configured to: identify whether an application for generating the first frame is a foreground application, and determine whether to perform the operation of controlling the plurality of cores for reducing the first time in response to identification that the application is a foreground application.

7. The electronic device of claim 1, wherein the processor is further configured to: identify, when the first frame is a frame to be first displayed among the plurality of frames, a progress level of an operation for generating the first frame at every preset time while the first frame is generated, and determine whether to perform the operation of controlling the plurality of cores for reducing the first time, based on the progress level of the operation for generating the first frame.

8. The electronic device of claim 7, wherein the processor is further configured to: identify whether the time spent for generating the first frame is longer than or equal to the second time, based on the progress level of the operation for generating the first frame, and determine whether to perform the operation of controlling the plurality of cores for reducing the first time in response to identification that the time spent for generating the first frame is longer than or equal to the second time.

9. The electronic device of claim 1, wherein the first frame comprises two or more subframes having different frame rates, and wherein the processor is further configured to determine whether to perform the operation of controlling the plurality of cores for reducing the first time in every subframe.

10. The electronic device of claim 1, wherein the processor is further configured to determine the operation frequency of the cores such that the first time is equal to or shorter than the second time.

11. A method of operating an electronic device, the method comprising:
determining a size of a load for processing a thread related to generation of a first frame and a second frame;
measuring a first time taken to generate the first frame among a plurality of frames comprising the first frame and the second frame while the first frame is generated and store the first frame in a buffer for displaying on a display of the electronic device;
identifying a second time corresponding to a frame rate of the display;
when the first time is less than the second time:
allocating at least one of a plurality of cores implemented in a processor of the electronic device as cores to process the thread, based on the determined size of the load;
determining an operation frequency of the plurality of cores, based on the determined size of the load; and controlling the plurality of cores to operate at the determined operation frequency while generating the second frame, when the first time is more than the second time:

determining to perform an operation of controlling the plurality of cores implemented in the processor of the electronic device for reducing a time for generating the second frame;

correcting the size of a load for processing the thread related to generation of the second frame, based on multiplying the size of the load and a ratio between the first time and the second time;

allocating at least one of the plurality of cores as cores to process the thread, based on the corrected size of the load;

determining an operation frequency of the plurality of cores, based on the corrected size of the load; and controlling the plurality of cores to operate at the determined operation frequency while generating the second frame.

12. The method of claim 11, wherein the determining of the size of the load comprises: determining a first size of the load for processing the thread related to generation of the second frame, based on a size of a load of a thread related to generation of another frame generated earlier than the first frame and the ratio between the first time and the second time; identifying a second size of a load for processing a thread related to generation of the second frame calculated by a scheduler; and determining a larger size between the first size and the second size as the size of the load for processing the thread corresponding to the second frame.

13. The method of claim 12, further comprising transmitting the first time and the second time to a kernel allocating resources for generating the plurality of frames by a framework generating the plurality of frames.

14. The method of claim 12, further comprising determining a core to process the thread, based on the determined size of the load.

15. The method of claim 11, further comprising changing the core allocated as the core to process the thread into another core, based on the determined size of the load.

16. The method of claim 11, further comprising: identifying whether an application for generating the first frame is a foreground application; and determining whether to perform the operation of controlling the plurality of cores for reducing the first time in response to identification that the application is a foreground application.

17. The method of claim 11, further comprising: when the first frame is a frame to be first displayed among the plurality of frames, identifying, a progress level of an operation for generating the first frame at every preset time while the first frame is generated; and determining whether to perform the operation of controlling the plurality of cores for reducing the first time, based on the progress level of the operation for generating the first frame.

18. The method of claim 17, further comprising: identifying whether the time spent for generating the first frame is longer than or equal to the second time, based on the progress level of the operation for generating the first frame; and determining whether to perform the operation of controlling the plurality of cores for reducing the first time in response to identification that the time spent for generating the first frame is longer than or equal to the second time.

19. The method of claim 11, wherein the first frame comprises two or more subframes having different frame rates, the method further comprising determining whether to perform the operation of controlling the plurality of cores for reducing the first time in every subframe.

20. The method of claim 11, wherein the determining of the operation frequency of the plurality of cores comprises determining the operation frequency of the plurality of cores such that the first time is equal to or shorter than the second time.

* * * * *